July 6, 1926.                                               1,591,035
F. S. GOLD
MEANS FOR SECURING REELS ON FISHING RODS
Filed Oct. 31, 1924
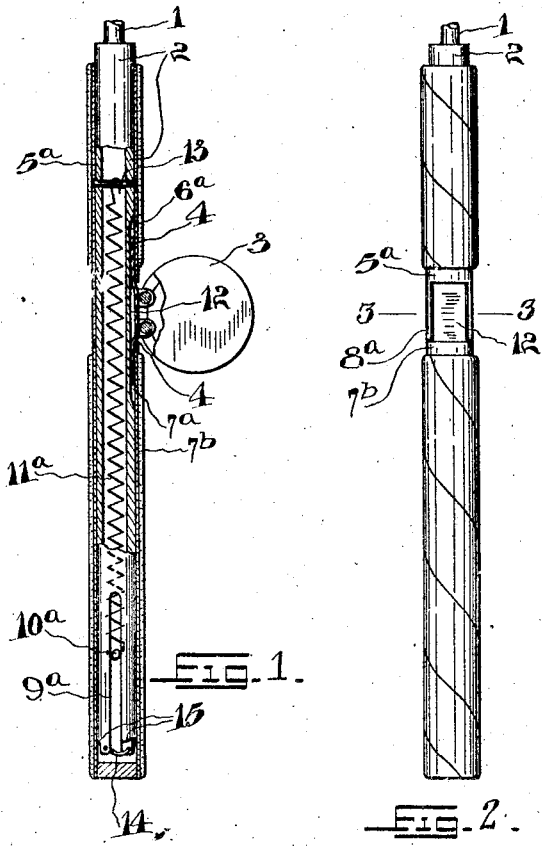
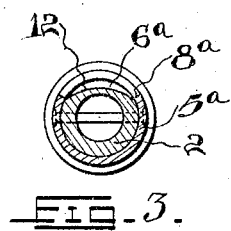
INVENTOR.
F. S. Gold.
BY J. Edward Mauber
ATTY.

Patented July 6, 1926.

1,591,035

UNITED STATES PATENT OFFICE.

FRANK S. GOLD, OF TORONTO, ONTARIO, CANADA.

MEANS FOR SECURING REELS ON FISHING RODS.

Application filed October 31, 1924. Serial No. 746,941.

This invention relates to means for securing reels on fishing rods. Heretofore it has been the practice to use a sliding band for frictionally holding the reel on the rod but the working of the reel has a tendency to loosen the frictional engagement of the band. My object, therefore, is to provide simple and convenient means which will securely hold the reel in position on the fishing rod and which may be easily and quickly operated to attach or detach the reel.

I attain my object my means of the constructions hereinafter described and indicated in the accompanying drawings in which—

Fig. 1 is a longitudinal section of the preferred form of the device;

Fig. 2 a front elevation of the same showing the parts as positioned when the reel is removed; and Fig. 3 a horizontal section on an enlarged scale on the line 3—3 in Fig. 2.

1 is a fishing rod of any type having an end portion 2 formed on or secured thereto in any suitable manner. 3 is a reel of ordinary construction on which the fishing line is adapted to be wound. The reel is provided with a pair of oppositely directed tangs 4 adapted to be received in sockets carried by the portion 2 whereby the reel may be detachably connected with the fishing rod.

In the constructions shown the sockets are so formed that they do not project beyond the normal curvature of the portion 2. The latter is provided with a flattened portion 12 adapted to co-operate with a tubular member $5^a$, secured by means of a pin 13 to the inner end of the portion 2, to form the socket $6^a$. The member $5^a$ is cut away to form longitudinal shoulders $8^a$ adjacent the flattened portion and these shoulders are adapted to engage the sides of the tang to prevent lateral movement of the latter.

A tubular member $7^b$, slidably mounted on the outer end of the portion 2, is adapted to co-operate with the flattened portion 12 to form the socket $7^a$. A longitudinal slot $9^a$, formed at the outer end of the handle portion 2, is adapted to receive a transverse pin $10^a$ carried by the member $7^b$. The latter is normally positioned, by means of a spring $11^a$ having its opposite ends connected with the pins 13 and $10^a$, against the outer end of the stationary member $5^a$.

To enable the sliding socket $7^a$ to be retained in its inoperative position, I form a transverse shoulder 15, at the outer end of the slot $9^a$, to engage the pin $10^a$. The outward movement of the socket $7^a$ relative to the socket $6^a$ is limited by a stop 14 formed on or secured to the end of the portion 2. When the socket member $7^b$ is pulled, against the tension of the spring $11^a$, until the pin $10^a$ engages the stop 14 it is merely necessary to slightly turn the socket member relative to the rod portion 2 to cause the pin to engage the shoulder 15 and thus lock the member. The reel tang 4 is then fitted in the socket $6^a$, the member $7^b$ turned to again position the pin in the slot which permits the spring to actuate the member to engage the other tang 4 and thus lock the reel on the rod.

The sockets $6^a$ and $7^a$ are formed as hand grips so that they may be both gripped by the operator when it is desired to move one relative to the other.

What I claim is:—

1. A fishing rod having a fixed socket; a butt end hand grip telescoped over and slidable on the rod and provided with a socket complementary to the first socket; a reel having a pair of tangs adapted to be received in the said sockets; and means for releasably holding the sliding grip in its tang engaging position.

2. A fishing rod having flattened and hollow portions formed therein; a tubular member fitted on the rod and having a portion cut away to form longitudinal shoulders adjacent the flattened portion; a reel having a pair of oppositely directed tangs, one of which is adapted to be received between one end of the flattened portion and the member, the said shoulders being adapted to engage the sides of the tang to prevent lateral movement of the latter; a second tubular member slidably mounted on the rod, the other tang being adapted to be received between the opposite end of the flattened portion and the second member, the rod having a longitudinal slot and a transverse shoulder formed therein; a pin carried by the second tubular member adapted to be received in the said slot and to engage the transverse shoulder; and resilient means carried within the hollow portion of the rod and connected with the latter and the pin whereby the tangs will be releasably locked in position on the rod by the tubular members when the pin is positioned in the slot, the pin being adapted to engage the transverse shoulder to retain the sliding member in an inoperative position.

3. A fishing rod having a fixed socket formed as a hand grip; a butt end slidable on the rod formed as a hand grip and provided with a socket complementary to the first socket; a reel having a pair of tangs adapted to be received in the said sockets when the hand grips are pulled in opposite directions; and means for releasably holding the sliding grip in its tang engaging position.

4. A fishing rod having a flattened part; a tubular member fitted on the rod and having a portion cut away to form longitudinal shoulders adjacent the flattened part; a reel having a pair of oppositely directed tangs, one of which is adapted to be received between one end of the flattened part and the member, the said shoulders being adapted to engage the sides of the tang to prevent lateral movement of the latter; a second tubular member slidably mounted on the rod, the other tang being adapted to be received between the opposite end of the flattened part and the second member; and means for retaining the slidable member in its tang engaging position.

Signed at Toronto, Canada, this 13th day of Oct. 1924.

FRANK S. GOLD.